UNITED STATES PATENT OFFICE.

WILTON C. DONN, OF WASHINGTON, DISTRICT OF COLUMBIA, ADMINISTRATOR OF HENRIK GAHN, DECEASED, ASSIGNOR TO CHARLES G. AM ENDE, OF HOBOKEN, NEW JERSEY.

IMPROVEMENT IN ANTISEPTIC COMPOSITIONS.

Specification forming part of Letters Patent No. 169,094, dated October 26, 1875; application filed October 14, 1874.

CASE A.

*To all whom it may concern:*

Be it known that HENRIK GAHN, deceased, late of Upsala, Sweden, invented an Improved Composition for Preventing Putrefaction in Animal Substances, of which the following is a specification:

This invention relates to a new compound which will very advantageously affect animal substances, and prevent putrefaction thereof. The present invention is the result of experiments on the composition described in Letters Patent No. 137,542, granted to said HENRIK GAHN, deceased, on the 8th day of April, 1873; and consists, more particularly, in the composition of boracic acid with a certain tannin. The antiseptic quality of boracic acid will most advantageously affect animal substances, and in nowise act injuriously.

The recipe for preparing the improved compound is as follows, to wit: Four parts boracic acid dissolved in one hundred parts heated or boiling water, to which is added one-half of one part of alum or soda, one part of glycerine, a very small portion of some essential oil, such as oil of peppermint, and one-fifth of one part of tannin derived from cloves.

The essential oil above mentioned may be omitted, and also the alum or soda in certain cases requiring protection for a limited period, and in such cases the glycerine may also be omitted.

The substance formed by putting together the aforementioned ingredients is allowed to stand for about one or two days until it is quite clear. It is then filtered or strained, and poured into bottles or other vessels for preservation, and afterward used as occasion may require.

In case the glycerine is not used in preparing the composition, the ingredients may also be mixed together in a dry condition, after having been reduced to a fine powder.

The composition may also be used for preserving purposes on vegetable as well as animal matter.

I claim as the invention of H. GAHN, deceased—

The composition of boracic acid and tannin derived from cloves, as described.

In testimony that I claim the foregoing as the invention of HENRIK GAHN I affix my signature in presence of two witnesses.

WILTON C. DONN,
*Administrator.*

Witnesses:
J. MCKENNEY,
A. MOORE.